United States Patent
Yu et al.

(10) Patent No.: US 11,679,707 B2
(45) Date of Patent: Jun. 20, 2023

(54) INBUILT SEAT LEG SUPPORT AND SEAT (71) Applicant: Yanfeng Adient Seating Co., Ltd., Shanghai (CN)

(72) Inventors: Jie Yu, Shanghai (CN); Aihua Mao, Shanghai (CN); Yin Zhang, Shanghai (CN); Jialin Du, Shanghai (CN); Jia Cao, Shanghai (CN)

(73) Assignee: Yanfeng Adient Seating Co., Ltd., Shanghai (CN)

( * ) Notice: Subject to any disclaimer, the term of this patent is extended or adjusted under 35 U.S.C. 154(b) by 70 days.

(21) Appl. No.: 17/310,948

(22) PCT Filed: Jun. 19, 2020

(86) PCT No.: PCT/CN2020/097086
§ 371 (c)(1),
(2) Date: Sep. 1, 2021

(87) PCT Pub. No.: WO2020/259409
PCT Pub. Date: Dec. 30, 2020

(65) Prior Publication Data
US 2022/0041087 A1 Feb. 10, 2022

(30) Foreign Application Priority Data
Jun. 25, 2019 (CN) .......................... 201910552192.X (51) Int. Cl.
*B60N 2/90* (2018.01)
*A47C 7/50* (2006.01)
*B60N 2/68* (2006.01)

(52) U.S. Cl.
CPC ............ *B60N 2/995* (2018.02); *A47C 7/5062* (2018.08); *B60N 2/68* (2013.01)

(58) Field of Classification Search
CPC ............................. B60N 2/995; A47C 7/5062
See application file for complete search history.

(56) References Cited

U.S. PATENT DOCUMENTS

| 2008/0191531 A1* | 8/2008 | Hoffmann | B60N 2/914 |
| | | | 297/284.1 |
| 2013/0099543 A1* | 4/2013 | An | A47C 7/5066 |
| | | | 297/423.22 |

(Continued)

FOREIGN PATENT DOCUMENTS

| CN | 111317284 A | * | 6/2020 | |
| CN | 112356746 A | * | 2/2021 | ............... B60N 2/07 |

(Continued)

*Primary Examiner* — Timothy J Brindley
(74) *Attorney, Agent, or Firm* — Wang Law Firm, Inc.

(57) ABSTRACT

The present invention relates to an inbuilt seat leg support and a seat. The seat leg support is mounted in a seat. The seat includes a base frame and a cushion frame located above the base frame. A receiving space is formed between the base frame and the cushion frame. The seat leg support includes a leg support frame configured to be received in the receiving space. The leg support frame is movable and adjustable relative to the cushion frame. Movement and adjustment of the leg support frame cause the leg support frame to extend out of the receiving space to be in an extended state or to retract into the receiving space to be in a received state. According to the present invention, a receiving space for a leg support frame is reserved between a base frame and a cushion frame, and the leg support frame is disposed to be movable so that the leg support frame can be received in the receiving space when not in use. Receiving a leg support in a seat causes the present invention to be space-saving.

7 Claims, 9 Drawing Sheets

(56) References Cited

U.S. PATENT DOCUMENTS

2018/0304791 A1* 10/2018 Hur .................. F16H 19/04
2019/0174924 A1*  6/2019 Kufel ................ A47C 11/00
2019/0322202 A1* 10/2019 Hur .................. B60N 2/933

FOREIGN PATENT DOCUMENTS

| DE | 102008005050 A1 | * | 7/2009 | ........... A47C 1/0347 |
| --- | --- | --- | --- | --- |
| FR | 70568 E | * | 5/1959 | |
| KR | 970004075 Y1 | * | 4/1997 | |
| KR | 100313005 B1 | * | 11/2001 | |
| KR | 200355128 Y1 | * | 7/2004 | |
| KR | 200357011 Y1 | * | 7/2004 | |
| KR | 20220058052 A | * | 5/2022 | |
| KR | 20220069494 A | * | 5/2022 | |
| WO | WO-2014009147 A1 | * | 1/2014 | ............. A47C 1/032 |
| WO | WO-2018091074 A1 | * | 5/2018 | |

* cited by examiner

INBUILT SEAT LEG SUPPORT AND SEAT

TECHNICAL FIELD

The present invention relates to the technical field of seats, and in particular, to an inbuilt seat leg support and a seat.

BACKGROUND

For automobile seats, adding a leg support to mid-row seats is one of the essentials to reflect the comfort and high-level sense of the mid-row seats, but because the mid-row seats have a relatively large number of integrated functions, the existing leg support takes up a lot of interior space, causing the seats to be visually clunky.

SUMMARY

An objective of the present invention is to overcome the defects of the prior art and provide an inbuilt seat leg support and a seat, which can solve the problem of the existing leg support occupying a large space.

A technical scheme for achieving the foregoing purpose is as follows.

The present invention provides an inbuilt seat leg support, installed in a seat. The seat includes a base frame and a cushion frame located above the base frame, where a receiving space is formed between the base frame and the cushion frame, the seat leg support includes a leg support frame configured to be received in the receiving space, the leg support frame is movable and adjustable relative to the cushion frame, and movement and adjustment of the leg support frame cause the leg support frame to extend out of the receiving space to be in an extended state or to retract into the receiving space to be in a received state.

The present invention has the following beneficial effect. A receiving space for a leg support frame is reserved between a base frame and a cushion frame, and the leg support frame is disposed to be movable so that the leg support frame can be received in the receiving space when not in use. Receiving a leg support in a seat causes the present invention to be space-saving.

A further improvement of the inbuilt seat leg support of the present invention lies in that sliding grooves are formed on a top face of the leg support frame in a direction of extension of the leg support, hooks are formed on the cushion frame corresponding to the sliding grooves, and disposing the hooks in the sliding grooves enables the movement and adjustment of the leg support frame relative to the cushion frame.

A further improvement of the inbuilt seat leg support of the present invention lies in that each of the hooks includes a vertical portion and a transverse portion fixed to a bottom of the vertical portion, each of the sliding grooves includes a vertical groove and a transverse groove in communication with each other, the transverse portion is disposed in the transverse groove, the vertical portion is disposed in the vertical groove, an upper surface of the transverse portion is covered with a cushion block, and an upper surface of the cushion block is attached to an upper surface of the transverse groove.

A further improvement of the inbuilt seat leg support of the present invention lies in that the sliding grooves are L-shaped grooves, a number of sliding grooves is two, the hooks are L-shaped members, a number of hooks is two, and the two hooks are disposed opposite to each other.

A further improvement of the inbuilt seat leg support of the present invention lies in that gap filling strips are further disposed between the cushion frame and the leg support frame.

A further improvement of the inbuilt seat leg support of the present invention lies in that an arcuate rack is disposed on a bottom face of the leg support frame, the seat leg support further includes a driving mechanism that is disposed corresponding to the rack and configured to drive the leg support frame to move, a gear meshed with the rack is disposed on the driving mechanism, driving the gear to rotate drives the rack to move, and the rack in turn drives the leg support frame to move.

A further improvement of the inbuilt seat leg support of the present invention lies in that the gear is connected to a motor, and the motor drives the gear to rotate.

A further improvement of the inbuilt seat leg support of the present invention lies in that a communicating space that affords communication between a front side and a rear side of the leg support frame is formed in the leg support frame; and the inbuilt seat leg support further includes a cover and a cable, one end of the cover is fixed at a position on the cushion frame that is located above the leg support frame, an other end of the cover extends into the communicating space from a front side of the leg support frame, one end of the cable is fixed at a position on the base frame that is located below the leg support frame, and an other end of the cable extends into the communicating space from a rear side of the leg support frame and is connected to an end portion corresponding to the cover.

A further improvement of the inbuilt seat leg support of the present invention lies in that a rotatable roller is disposed on the front side of the leg support frame, a fixed pulley is disposed on the rear side of the leg support frame, the cover is wound around the roller, and the cable is wound around the fixed pulley.

The present invention further provides a seat including the above inbuilt seat leg support.

BRIEF DESCRIPTION OF THE DRAWINGS

FIG. 1 (a) is a schematic diagram of an inbuilt seat leg support in a received state according to the present invention.

FIG. 1 (b) is a schematic diagram of the inbuilt seat leg support in an extended state according to the present invention.

DETAILED DESCRIPTION

The present invention will be further described below with reference to the accompanying drawings and specific embodiments.

Figure 1:
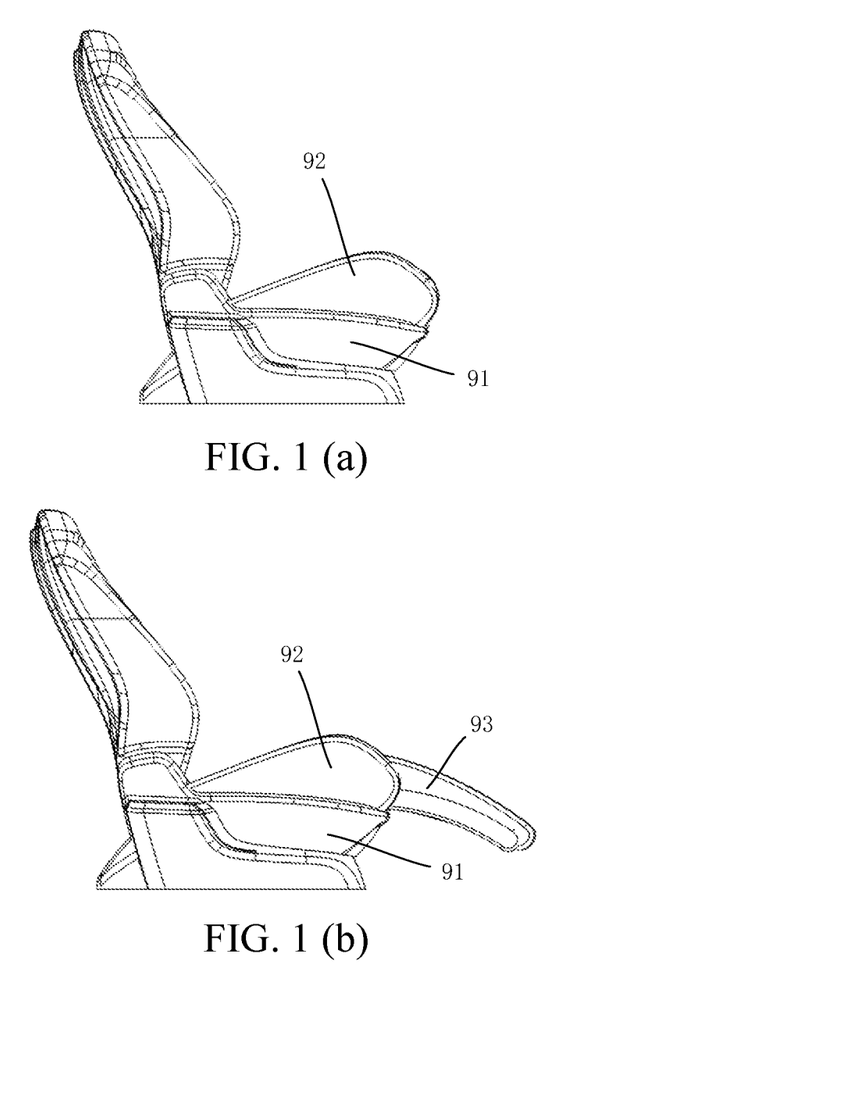

Referring to FIG. 1 (*a*) and FIG. 1 (*b*), the present invention provides an inbuilt seat leg support and a seat. The seat leg support 93 may be received inside the seat and has the characteristic of saving space. A structure of the inbuilt seat leg support of the present invention is described below with reference to the accompanying drawings.

As shown in FIG. 1 (*a*) and FIG. 1 (*b*), the seat includes a base 91 at a bottom and a cushion 92 located on the base 91, and the seat leg support 93 is received in a gap between the base 91 and the cushion 92. As further shown in FIG. 2 and FIG. 3, a base frame 910 is formed in the base 91, and a cushion frame 920 is formed in the cushion 92. The cushion frame 920 is used to support the cushion 92, and a shape of the cushion frame 92 also fits a shape of the cushion 92, which is a shape having a high front side and a low rear side. Therefore, a top plate of the cushion frame 920 is obliquely disposed, and side plates on left and right sides of the cushion frame are fixedly connected to the base frame 910. The base frame 910 includes a support plate on which a pair of fixed side rails are erected corresponding to the two side plates of the cushion frame 920, and the two side plates of the cushion frame 920 are fixedly connected to the corresponding fixed side rails.

Figure 2:
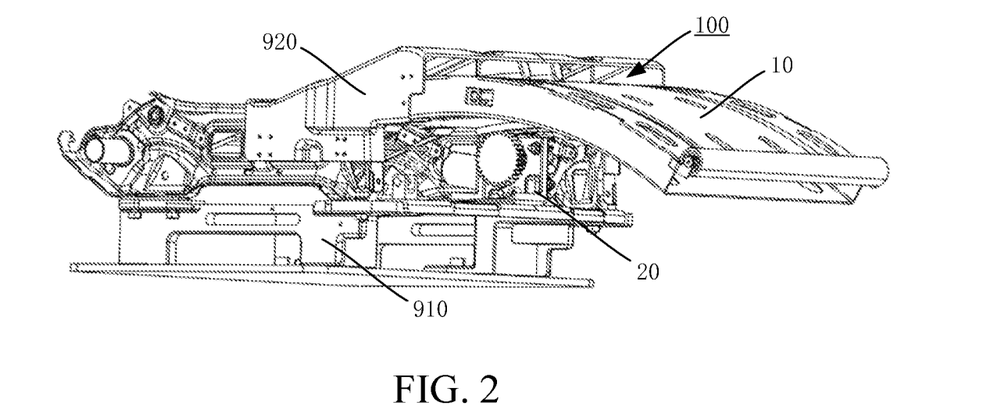
FIG. 2 is a schematic structural diagram showing connection of a base frame, a cushion frame, and a leg support frame in the inbuilt seat leg support according to the present invention.
Figure 3:
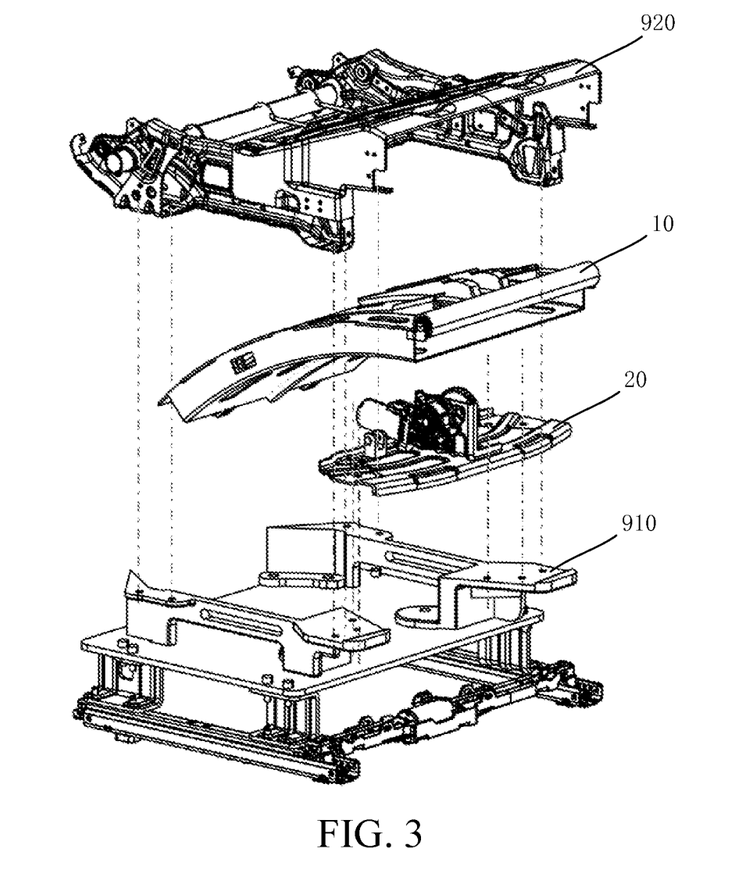
FIG. 3 is an exploded view showing the connection of the base frame, the cushion frame, and the leg support frame in the inbuilt seat leg support according to the present invention.
Figure 4:
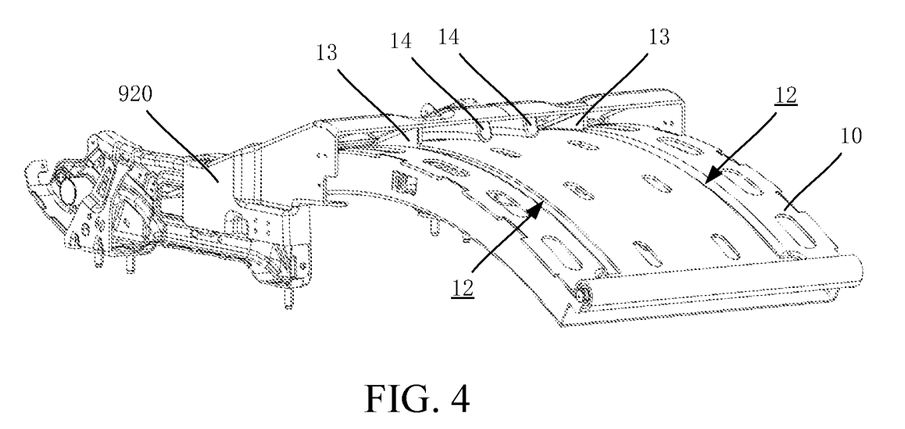
FIG. 4 is a schematic diagram showing connection of the cushion frame and the leg support frame in the inbuilt seat leg support according to the present invention.
Figure 5:
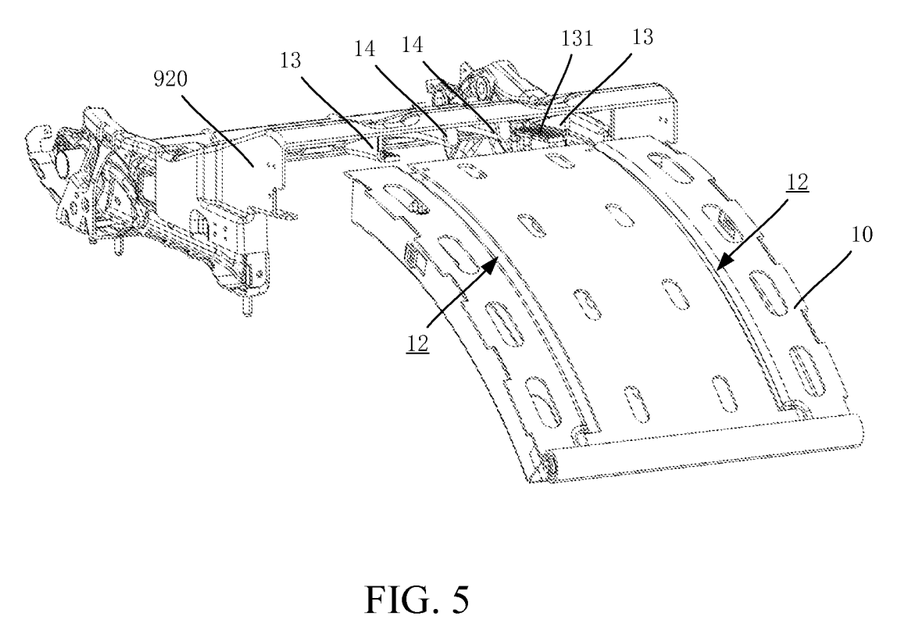
FIG. 5 is a schematic diagram showing separation of the cushion frame and the leg support frame in the inbuilt seat leg support according to the present invention.
Figure 6:
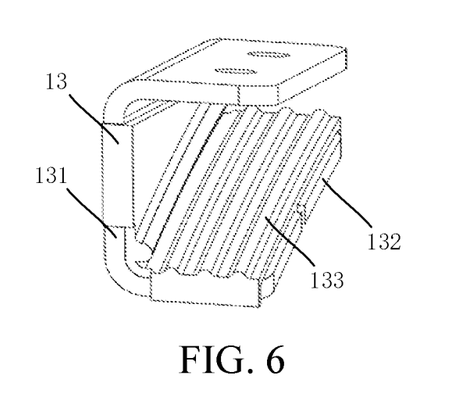
FIG. 6 is a schematic structural diagram of hooks in the inbuilt seat leg support according to the present invention.

A receiving space 100 is formed between the support plate of the base frame 910 and the top plate of the cushion frame 920. The inbuilt seat leg support of the present invention includes a leg support frame 10 configured to be received in the receiving space 100, the leg support frame 10 is movable and adjustable relative to the cushion frame 920, and movement and adjustment of the leg support frame 10 cause the leg support frame 10 to extend out of the receiving space 100 to be in an extended state or to retract into the receiving space 100 to be in a received state. When the leg support is in the received state, the leg support is received in the receiving space inside the seat and does not occupy the space in a car, while when the leg support is in an extended state, the leg support fully extends out of a front side of the cushion for a passenger to place a calf. Preferably, the leg support frame 10 is arc-shaped, which conforms to a curve of a human body when sitting on a seat.

As shown in FIG. 3 to FIG. 7, sliding grooves 12 are formed on a top face of the leg support frame 10 in a direction of extension of the leg support, hooks 13 are formed on the cushion frame 920 corresponding to the sliding grooves 12, and disposing the hooks 13 in the sliding grooves 12 enables the movement and adjustment of the leg support frame 10 relative to the cushion frame 920. The hooks 13 not only play a part of limiting a position, but also causes the leg support frame 10 to be hung under the cushion frame 920.

Each of the hooks 13 includes a vertical portion and a transverse portion fixed to a bottom of the vertical portion. Correspondingly, each of the sliding grooves 12 includes a vertical groove and a transverse groove in communication with each other, the transverse portion of the hook 13 is disposed in the transverse groove of the sliding groove 12, and the vertical portion of the hook 13 is disposed in the vertical groove of the sliding groove 12. Preferably, a cushion block 133 is fixed on a surface of the hook 13. Since the leg support frame is arc-shaped, the sliding groove 12 is also arc-shaped, and the cushion block 133 has a radian that fits the sliding groove 12. A friction face for reducing friction is formed on an upper surface of the cushion block 133, and the friction face is attached to an upper surface of the transverse groove. During the movement and adjustment of the leg support frame 10, the friction face of the cushion block 133 and an upper surface of the sliding groove 12 slide and rub, which reduces a friction coefficient, so that a user can pull out and retract the leg support, and reduce noise generated by friction. Further, striped protrusions arranged in a moving direction of the sliding groove are formed on the friction face of the cushion block 133. Preferably, the sliding grooves 12 are L-shaped grooves, a number of sliding grooves is two, correspondingly, the hooks 13 are L-shaped members, a number of hooks is also two, and the two hooks 13 are disposed opposite to each other.

Preferably, gap filling strips 14 are further disposed between the cushion frame 920 and the leg support frame 10. A number of gap filling strips 14 is two, and a lower surface of the gap filling strips is a curved surface that fits the leg support frame 10. The gap filling strip 14 applies a downward pressing force to the leg support frame 10 to ensure that the cushion block 133 is attached to the upper surface of the sliding groove 12, thereby avoiding generating noise due to an excessively large gap between the hook 13 and the sliding groove 12 during the movement of the leg support frame 10.

Figure 7:
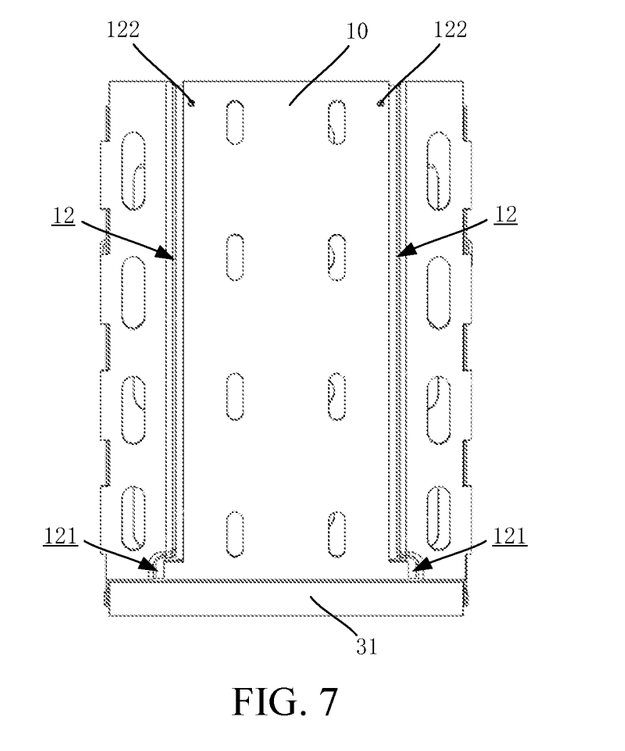
FIG. 7 is a schematic diagram of a top face of the leg support frame in the inbuilt seat leg support according to the present invention.

A bent segment 121 is formed on a front end of each of the sliding grooves 12. Since a distance between the hooks 13 is constant, the hook 13 cannot slide into the bent segment 121. Therefore, when the leg support is received in the receiving space, the hook 13 is located close to the bent segment 121 and abuts against a side portion of the bent segment 121. A rear end of the sliding groove 12 is not closed, and the hook 13 is connected to inside of the sliding groove 12 from the rear end of the sliding groove 12 during mounting. Preferably, after the hooks 13 are connected to the sliding grooves 12, a limiting pin 122 is disposed on the rear end of each of the sliding grooves 12. The limiting pins 122 extend through a through hole to the sliding grooves 12 from the top face of the leg support frame 10, so as to limit positions of the hooks 13 and prevent the hooks 13 from falling out of the rear end of the sliding grooves 12. When the leg support is in the extended state, the hook 13 is close to the rear end of the sliding groove 12 and abuts against the limiting pins 122.

As shown in FIG. 8 to FIG. 12, an arcuate rack 11 is disposed on a bottom face of the leg support frame 10, the seat leg support further includes a driving mechanism that is disposed corresponding to the rack 11 and configured to drive the leg support frame 10 to move, and a gear 21 meshed with the rack 11 is disposed on the driving mechanism, so that the rack 11 is driven to move by driving the gear 21 to rotate, and then the rack 11 drives the leg support frame 10 to move. Preferably, the gear 21 is connected to a motor 22, and the motor 22 drives the gear to rotate.

Figure 11:
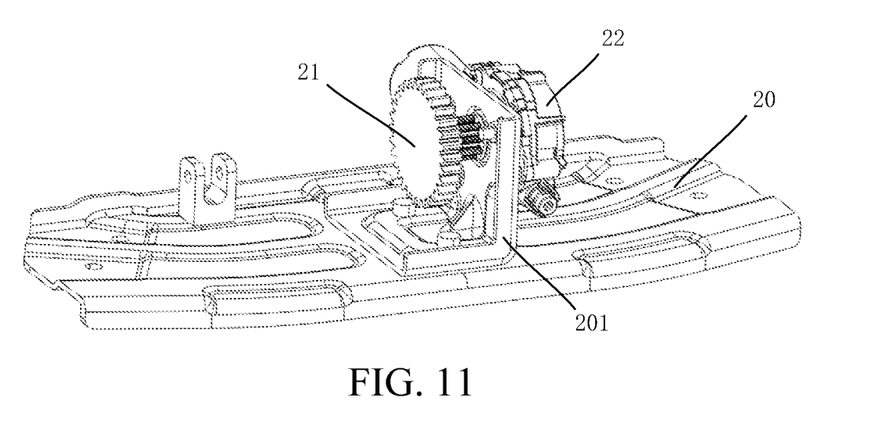
FIG. 11 is a schematic structural diagram of a driving mechanism in the inbuilt seat leg support according to the present invention.

In an implementation, as shown in FIG. 3 and FIG. 11, a mounting plate 20 for mounting the gear 21 and the motor 22 is fixed to a front side of the base frame 910. An L-shaped mounting member 201 is fixed to the mounting plate 20. The mounting member 201 has a horizontal portion and a vertical portion. The horizontal portion of the mounting member 201 is fixed to the mounting plate 20, and a connecting hole is formed on the vertical portion of the mounting member 201. The gear 21 and the motor 22 are disposed on two sides of the connecting hole, and a shaft of the motor 22 passes through the connecting hole and is connected to the gear 21 to drive the gear 21 to rotate.

Figure 12:
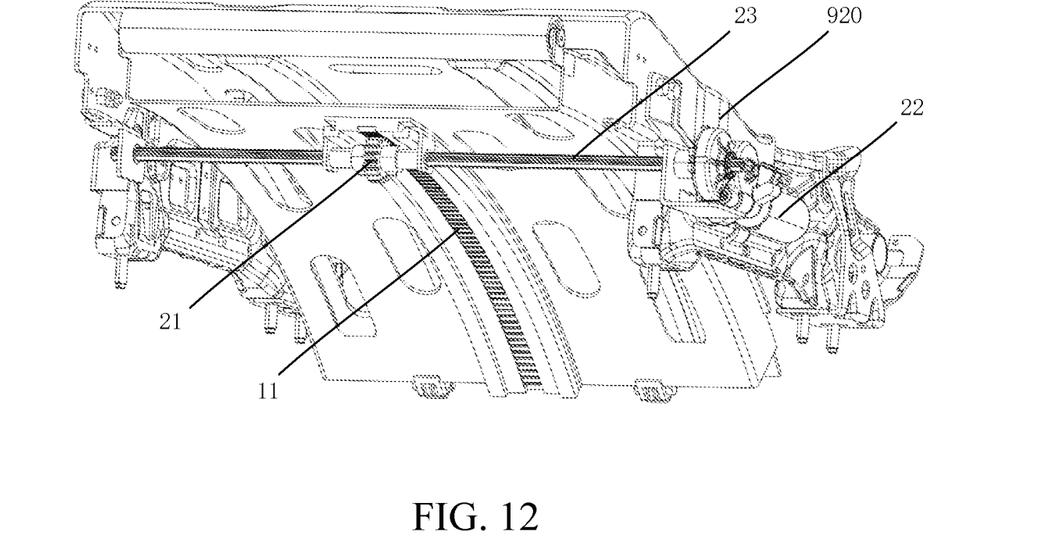
FIG. 12 is a schematic diagram of a driving mechanism in another embodiment of the inbuilt seat leg support according to the present invention.

In another implementation, as shown in FIG. 12, the motor 22 is mounted at a position on the side plate of the cushion frame 920 that is close to a front side, and since the rack 11 is disposed in the middle of the leg support frame 10, the shaft of the motor 22 is connected to the gear 21 disposed corresponding to the rack by using a transmission rod 23. Two ends of the transmission rod 23 are rotatably connected to the two side plates of the cushion frame 920, so that the motor 22 drives the transmission rod 23 to rotate and then drives the gear 21 to rotate.

Figure 8:
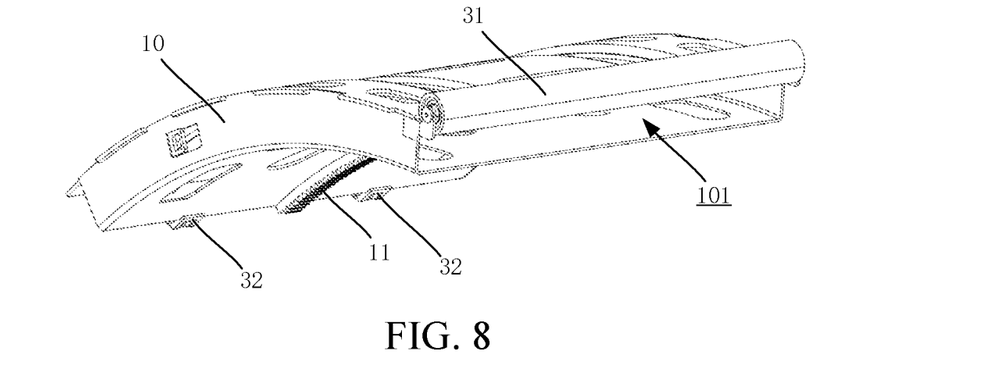
FIG. 8 is a schematic structural diagram of the leg support frame in the inbuilt seat leg support according to the present invention.
Figure 9:
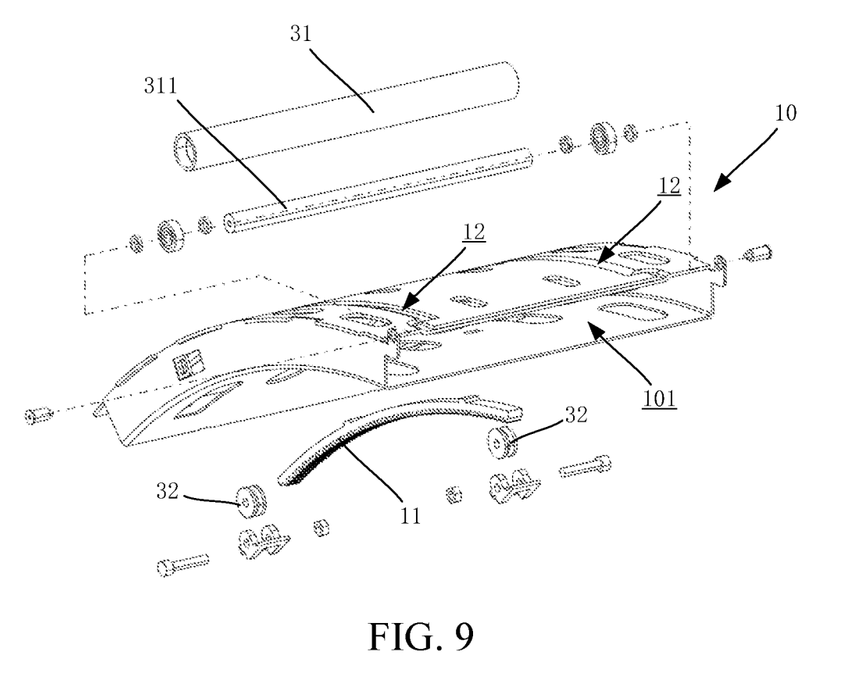
FIG. 9 is an exploded structural view of the leg support frame in the inbuilt seat leg support according to the present invention.
Figure 10:
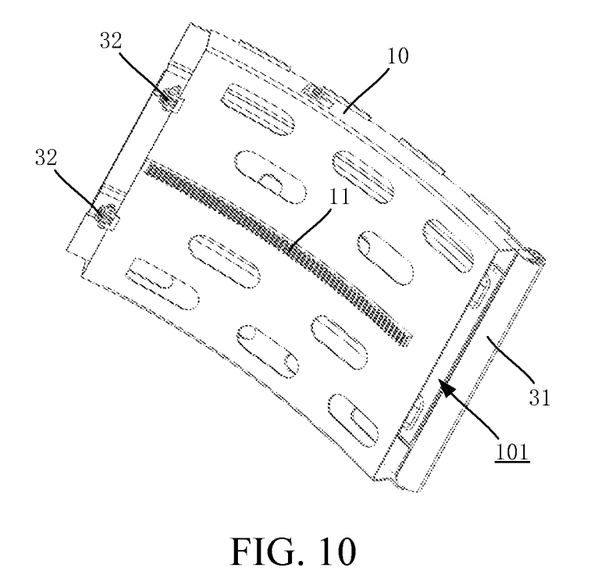
FIG. 10 is a schematic diagram of a bottom face of the leg support frame in the inbuilt seat leg support according to the present invention.

As shown in FIG. 8 to FIG. 10, a communicating space 101 that affords communication between a front side and a rear side of the leg support frame 10, so that an opening is formed on each of the front side and the rear side of the leg support frame 10. A fixed shaft 311 is disposed on a top of a front side of the leg support frame 10, and a roller 31 is sleeved on the fixed shaft 311, so that the roller 31 is rotatable, and a fixed pulley is disposed on a bottom of a rear side of the leg support frame 10.

Figure 13:
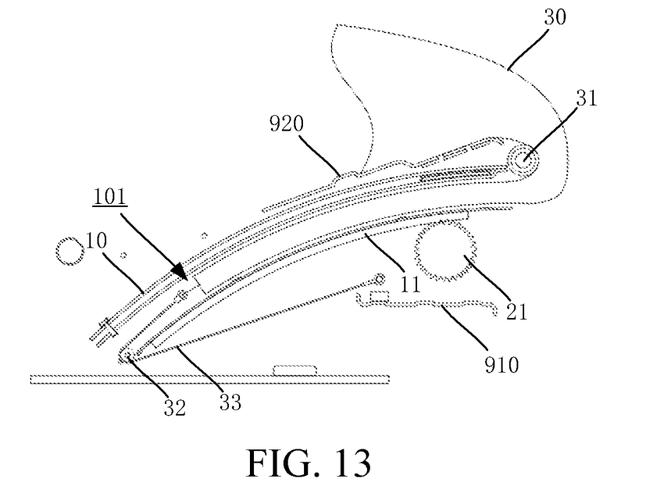
FIG. 13 is a schematic diagram of a cover and a cable when the leg support in the inbuilt seat leg support is in a received state according to the present invention.
Figure 14:
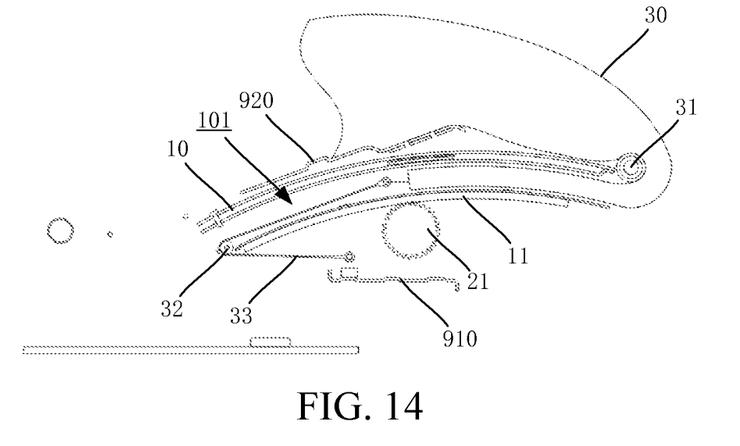
FIG. 14 is a schematic diagram of the cover and the cable when the leg support in the inbuilt seat leg support gradually extends out or retracts according to the present invention.
Figure 15:
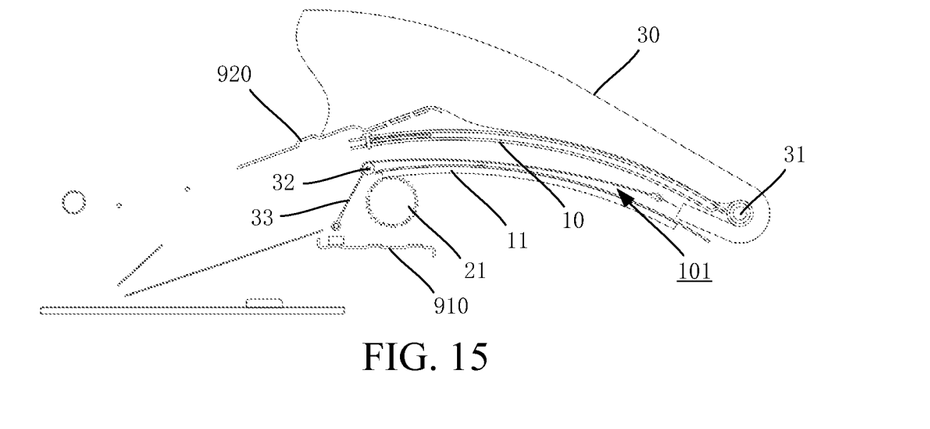
FIG. 15 is a schematic diagram of the cover and the cable when the leg support in the inbuilt seat leg support is in an extended state according to the present invention.

As shown in FIG. 13 to FIG. 15, the inbuilt seat leg support further includes a cover 30 and a cable 33. One end of the cover 30 is fixed at a position on the cushion frame 920 that is located above the leg support frame 10, and an other end of the cover is wound around the roller 31 and extends into the communicating space 101 from the opening on the front side of the leg support frame 10. One end of the cable 33 is fixed at a position of the base frame 910 that is located below the leg support frame 10, and an other end of the cable is wound around the corresponding fixed pulley 32 and extends into the communicating space 101 from the opening on the rear side of the leg support frame 10. An end portion of the cable 33 in the communicating space 101 is connected to an end portion of the cover 30.

By means of such a structure, the cover 30 can automatically cover the surface of an extended part of the leg support frame 10 as the leg support frame 10 is extended, and can automatically retract into the communicating space 101 as the leg support frame 10 is retracted. When the leg support is gradually extended from a received state, the leg support frame 10 moves forward under the drive of the gear 21, and the roller 31 pushes the cover 30 to move forward. Since a total length of the cover 30 remains unchanged, the cover 30 located in the communicating space 101 leaves the communicating space 101 with the extension of the leg support and covers the upper surface of the leg support frame 10, and in the meanwhile, the end portion of the cover 30 that is located in the communicating space 101 pulls the end portion of the cable 33, so that the cable 33 continuously enters the communicating space, and a part of the cable 33 that is located outside the communicating space 101 is continuously shortened until the leg support is in an extended state. Conversely, when the leg support is gradually retracted from the extended state, the leg support frame 10 moves backward under the drive of the gear 21, and the fixed pulley 32 pushes the cable 33 to move backward. Since a total length of the cable 33 remains unchanged, the cable 33 located in the communicating space 101 leaves the communicating space 101 with the retraction of the leg support, and in the meanwhile, the end portion of the cable 33 that is located in the communicating space 101 pulls the end portion of the cover 30, so that the cover 30 continuously enters the communicating space, and a part of the cover 30 that covers the upper surface of the leg support frame is continuously shortened until the leg support returns to the received state.

The process of using the leg support is to be described below.

When not in use, the leg support is received in the receiving space, and when needed, the motor is started to rotate forward to rotate the gear. Since the gear is meshed with the rack of the leg support frame, the gear drives the rack and drives the leg support frame to move forward until the hooks on the cushion frame abut against limiting pins on the rear end of the sliding grooves, the motor stops, and the leg support is in the extended state at this point. In addition, in the process, the cover extends from the communicating space with the extension of the leg support and covers the upper surface of the leg support frame.

When the leg support is no longer used, the motor is started to rotate backward to rotate the gear, the gear drives the rack and drives the leg support frame to move backward until the hooks on the cushion frame are located at a bent segment on the front end of the sliding grooves, the motor stops, and the leg support returns to the received state at this point. In addition, in the process, with the retraction of the leg support, the cable pulls the cover to retract into the communicating space.

The present invention further provides a seat, including the base, the cushion, and the inbuilt seat leg support described above. A specific structure of the seat is in the prior art, and therefore details are not described.

The inbuilt seat leg support and the seat of the present invention have the following beneficial effects. According to the present invention, a receiving space for a leg support frame is reserved between a base frame and a cushion frame, and the leg support frame is disposed to be movable so that the leg support frame can be received in the receiving space when not in use. Receiving a leg support in a seat causes the present invention to be space-saving. In addition, because Asians are generally thinner, shorter, and have obvious characteristics of a longer upper body and a shorter lower body than Westerners, most Asians require a smaller sitting depth of the cushion than that of the current commonly designed cushion when siting in a seat. In order to meet comfort requirements of Asians, the inbuilt seat leg support of the present invention may further allow a part of the front end of the leg support to extend out of the cushion as an extension of the cushion.

The present invention is described above in detail with reference to the embodiments of the accompanying drawings, and a person of ordinary skill in the art may make various modifications to the present invention according to the above description. Therefore, some details in the embodiments shall not constitute a limitation on the present invention, and the protection scope of the present invention shall be subject to the scope of the appended claims.

What is claimed is:

1. An inbuilt seat leg support, installed in a seat, the seat comprising a base frame and a cushion frame located above the base frame, wherein a receiving space is formed between the base frame and the cushion frame, the seat leg support comprises a leg support frame configured to be received in the receiving space, the leg support frame is movable and adjustable relative to the cushion frame, and movement and adjustment of the leg support frame cause the leg support frame to extend out of the receiving space to be in an extended state or to retract into the receiving space to be in a received state;

wherein sliding grooves are formed on a top face of the leg support frame in a direction of extension of the leg support, hooks are formed on the cushion frame corresponding to the sliding grooves, and disposing the hooks in the sliding grooves enables the movement and adjustment of the leg support frame relative to the cushion frame;

each of the hooks comprises a vertical portion and a transverse portion fixed to a bottom of the vertical portion, each of the sliding grooves comprises a vertical groove and a transverse groove in communication with each other, the transverse portion is disposed in the transverse groove, the vertical portion is disposed in the vertical groove, an upper surface of the transverse portion is covered with a cushion block, and an upper surface of the cushion block is attached to an upper surface of the transverse groove.

2. The inbuilt seat leg support according to claim 1, wherein the sliding grooves are L-shaped grooves, a number of sliding grooves is two, the hooks are L-shaped members, a number of hooks is two, and the two hooks are disposed opposite to each other.

3. The inbuilt seat leg support according to claim 1, wherein gap filling strips are further disposed between the cushion frame and the leg support frame.

4. The inbuilt seat leg support according to claim 1, wherein an arcuate rack is disposed on a bottom face of the leg support frame, the seat leg support further comprises a driving mechanism that is disposed corresponding to the rack and configured to drive the leg support frame to move, a gear meshed with the rack is disposed on the driving mechanism, driving the gear to rotate drives the rack to move, and the rack in turn drives the leg support frame to move.

5. The inbuilt seat leg support according to claim 4, wherein the gear is connected to a motor, and the motor drives the gear to rotate.

6. The inbuilt seat leg support according to claim 1, wherein a communicating space that affords communication between a front side and a rear side of the leg support frame is formed in the leg support frame; and the inbuilt seat leg support further comprises a cover and a cable, one end of the cover is fixed at a position on the cushion frame that is located above the leg support frame, an other end of the cover extends into the communicating space from a front side of the leg support frame, one end of the cable is fixed at a position on the base frame that is located below the leg support frame, and an other end of the cable extends into the communicating space from a rear side of the leg support frame and is connected to an end portion corresponding to the cover.

7. The inbuilt seat leg support according to claim 6, wherein a rotatable roller is disposed on the front side of the leg support frame, a fixed pulley is disposed on the rear side of the leg support frame, the cover is wound around the roller, and the cable is wound around the fixed pulley.

* * * * *